(12) United States Patent
Fan et al.

(10) Patent No.: US 9,691,074 B2
(45) Date of Patent: Jun. 27, 2017

(54) PERFORMANCE EVALUATION OF AN INFORMATION RESOURCE IN A COMPUTER NETWORK ENVIRONMENT

(71) Applicant: Google Inc., Mountain View, CA (US)

(72) Inventors: Jieyan Fan, Fremont, CA (US); Xuan Liu, Mountain View, CA (US); Yubao Yu, Sunnyvale, CA (US); Yuan Zhuge, Mountain View, CA (US); Itai Raz, Palo Alto, CA (US); Kanupriya Singhal, Sunnyvale, CA (US); Timothy John Wright, San Francisco, CA (US)

(73) Assignee: Google Inc., Mountain View, CA (US)

( * ) Notice: Subject to any disclaimer, the term of this patent is extended or adjusted under 35 U.S.C. 154(b) by 671 days.

(21) Appl. No.: 14/230,507

(22) Filed: Mar. 31, 2014

(65) Prior Publication Data
US 2015/0372890 A1 Dec. 24, 2015

(51) Int. Cl.
*G06F 15/173* (2006.01)
*G06Q 30/02* (2012.01)

(52) U.S. Cl.
CPC ......... *G06Q 30/02* (2013.01); *G06Q 30/0242* (2013.01); *G06Q 30/0246* (2013.01)

(58) Field of Classification Search
CPC . G06Q 30/02; G06Q 30/0242; G06Q 30/0246
See application file for complete search history.

(56) References Cited

U.S. PATENT DOCUMENTS

| | | |
|---|---|---|
| 2002/0184069 A1 | 12/2002 | Kosiba et al. |
| 2005/0065837 A1 | 3/2005 | Kosiba et al. |
| 2008/0281627 A1 | 11/2008 | Chang et al. |
| 2010/0094878 A1 | 4/2010 | Soroca et al. |
| 2011/0238487 A1 | 9/2011 | Chang et al. |
| 2011/0258044 A1 | 10/2011 | Kargupta |
| 2011/0258049 A1 | 10/2011 | Ramer et al. |
| 2012/0014519 A1 | 1/2012 | Kosiba et al. |
| 2012/0016711 A1 | 1/2012 | Kosiba et al. |
| 2012/0016712 A1 | 1/2012 | Kosiba et al. |
| 2012/0041936 A1 | 2/2012 | Yu et al. |
| 2012/0042000 A1 | 2/2012 | Heins et al. |
| 2012/0209705 A1 | 8/2012 | Ramer et al. |
| 2012/0209706 A1 | 8/2012 | Ramer et al. |
| 2012/0209707 A1 | 8/2012 | Ramer et al. |
| 2012/0209708 A1 | 8/2012 | Ramer et al. |
| 2012/0209709 A1 | 8/2012 | Ramer et al. |
| 2012/0209710 A1 | 8/2012 | Ramer et al. |
| 2012/0215602 A1 | 8/2012 | Ramer et al. |

(Continued)

*Primary Examiner* — Richard G Keehn
(74) *Attorney, Agent, or Firm* — Foley & Lardner LLP; John D. Lanza

(57) ABSTRACT

Systems and methods of evaluating performance of an information resource in a computer networked environment are provided. A data processing system can obtain a request for a performance metric of an information resource. A number of visits to the information resource by an audience segment, and an aggregate number of visits to the information resource can be determined and used to identify a first metric. A global audience segment number and a global aggregate audience number can also be determined and used to identify a second metric. A performance metric associated with the information resource can get determined based on the first metric and the second metric.

20 Claims, 4 Drawing Sheets

(56) References Cited

U.S. PATENT DOCUMENTS

| | | |
|---|---|---|
| 2012/0215612 A1 | 8/2012 | Ramer et al. |
| 2012/0215622 A1 | 8/2012 | Ramer et al. |
| 2012/0215623 A1 | 8/2012 | Ramer et al. |
| 2012/0215624 A1 | 8/2012 | Ramer et al. |
| 2012/0215625 A1 | 8/2012 | Ramer et al. |
| 2012/0215626 A1 | 8/2012 | Ramer et al. |
| 2012/0215635 A1 | 8/2012 | Ramer et al. |
| 2012/0215639 A1 | 8/2012 | Ramer et al. |
| 2012/0215640 A1 | 8/2012 | Ramer et al. |
| 2012/0303559 A1 | 11/2012 | Dolan |
| 2013/0046584 A1 | 2/2013 | Yu et al. |
| 2013/0136252 A1 | 5/2013 | Kosiba et al. |
| 2013/0198203 A1* | 8/2013 | Bates ................ G06F 17/30861 707/748 |
| 2013/0304581 A1 | 11/2013 | Soroca et al. |
| 2014/0289036 A1* | 9/2014 | Aurigemma ....... G06Q 30/0202 705/14.42 |
| 2014/0303953 A1* | 10/2014 | Bates .................... G06Q 30/02 703/13 |
| 2014/0304391 A1* | 10/2014 | George ................. G06Q 30/02 709/224 |

* cited by examiner

PERFORMANCE EVALUATION OF AN INFORMATION RESOURCE IN A COMPUTER NETWORK ENVIRONMENT

BACKGROUND

In a computer networked environment such as the internet, entities such as people or companies provide information for public display on web pages or other online documents. The documents can include information provided by the entities via a computing device for display on the internet. Content can also be provided by third parties for display on the documents together with the information provided by the entities. Thus, a person viewing a document can access the information that is the subject of the document, as well as third party content that may or may not be related to the subject matter of the document.

SUMMARY

At least one aspect is directed to a computer implemented method of evaluating performance of an information resource in a computer networked environment. The method can include obtaining, by a data processing system, from a content publisher computing device via a computer network, a request for a performance metric of the information resource. The method can include determining, by the data processing system, a number of visits to the information resource by an audience segment, and determining an aggregate number of visits to the information resource. The aggregate number of visits to the information resource can be greater than the number of visits to the information resource by the audience segment. The method can include identifying a first metric. The first metric can indicate a first ratio of the number of visits to the information resource by the audience segment to the aggregate number of visits to the information resource. The method can include obtaining, by the data processing system, a global audience segment number, and obtaining, by the data processing system, a global aggregate audience number. The global aggregate audience number can be greater than the global audience segment number. The method can include identifying a second metric. The second metric can indicate a second ratio of the global audience segment number to the global aggregate audience number. The method can include generating the performance metric based on the first ratio and the second ratio.

At least one aspect is directed to a system of evaluating performance of an information resource in a computer networked environment. The system can include a data processing system configured to obtain, from a content publisher computing device via a computer network, a request for a performance metric of the information resource. The data processing system can determine a number of visits to the information resource by an audience segment, and can determine an aggregate number of visits to the information resource. The aggregate number of visits to the information resource can be greater than the number of visits to the information resource by the audience segment. The data processing system can identify a first metric. The first metric can indicate a first ratio of the number of visits to the information resource by the audience segment to the aggregate number of visits to the information resource. The data processing system can obtain a global audience segment number, and can obtain a global aggregate audience number. The global aggregate audience number can be greater than the global audience segment number. The data processing system can identify a second metric. The second metric can indicate a second ratio of the global audience segment number to the global aggregate audience number. The data processing system can generate the performance metric based on the first ratio and the second ratio, and can provide a report including the performance metric from the data processing system to the content publisher computing device via the computer network.

At least one aspect is directed to a computer readable storage medium storing instructions that when executed by one or more data processors, cause the one or more data processors to perform operations. The operations can obtain from a content publisher computing device via a computer network, a request for a performance metric of the information resource. The operations can determine a number of visits to the information resource by an audience segment, and can determine an aggregate number of visits to the information resource. The aggregate number of visits to the information resource can be greater than the number of visits to the information resource by the audience segment. The operations can identify a first metric. The first metric can indicate a first ratio of the number of visits to the information resource by the audience segment to the aggregate number of visits to the information resource. The operations can obtain a global audience segment number, and can obtain a global aggregate audience number. The global aggregate audience number can be greater than the global audience segment number. The operations can identify a second metric. The second metric can indicate a second ratio of the global audience segment number to the global aggregate audience number, and can generate the performance metric based on the first ratio and the second ratio.

These and other aspects and implementations are discussed in detail below. The foregoing information and the following detailed description include illustrative examples of various aspects and implementations, and provide an overview or framework for understanding the nature and character of the claimed aspects and implementations. The drawings provide illustration and a further understanding of the various aspects and implementations, and are incorporated in and constitute a part of this specification.

BRIEF DESCRIPTION OF THE DRAWINGS

The accompanying drawings are not intended to be drawn to scale. Like reference numbers and designations in the various drawings indicate like elements. For purposes of clarity, not every component may be labeled in every drawing. In the drawings.

DETAILED DESCRIPTION

Figure 1:
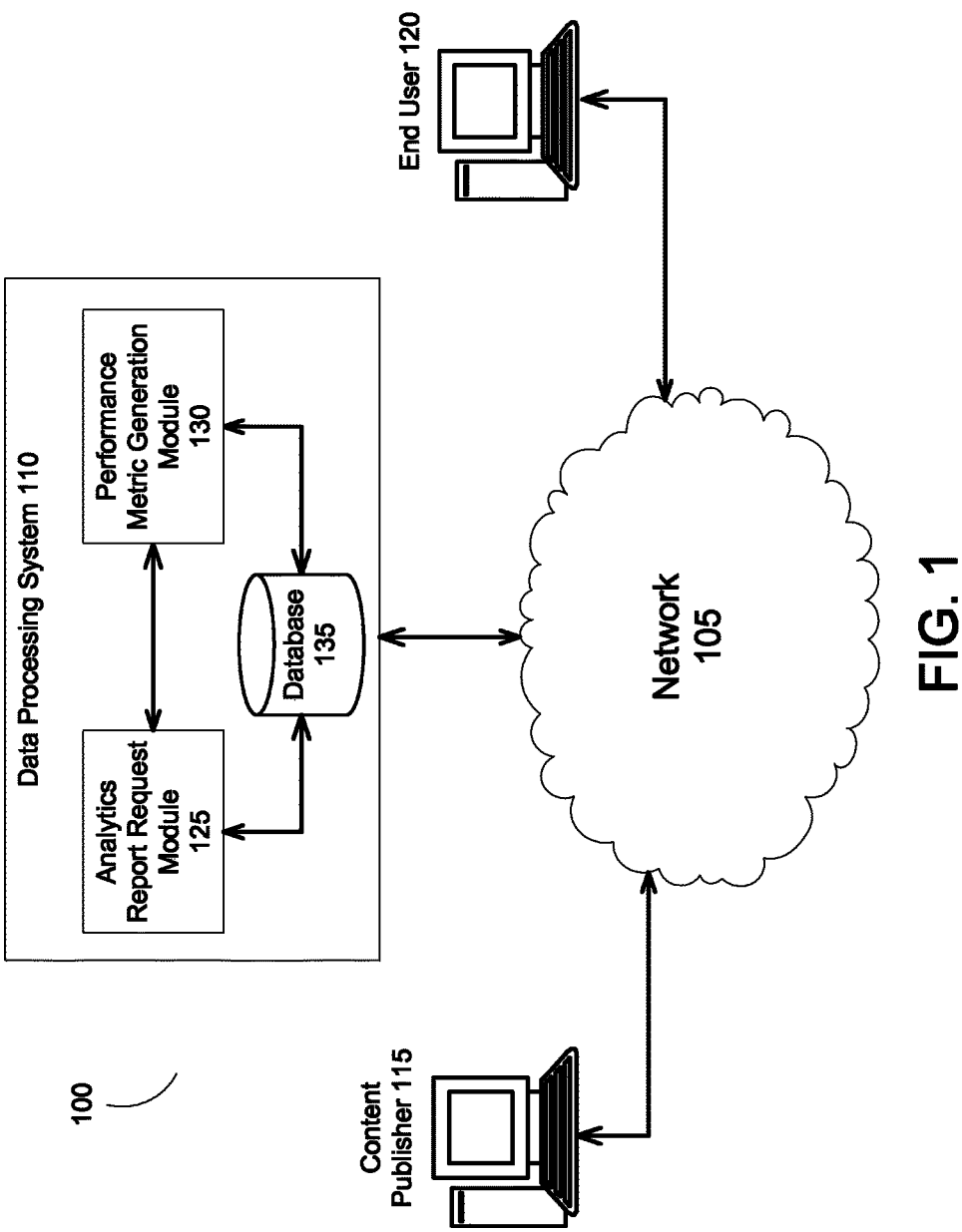
FIG. 1 is a block diagram depicting one example environment to evaluate performance of information resources, according to an illustrative implementation.

Following below are more detailed descriptions of various concepts related to, and implementations of, methods, apparatuses, and systems of providing information via a computer network. The various concepts introduced above and discussed in greater detail below may be implemented in any of numerous ways, as the described concepts are not limited to any particular manner of implementation.

Systems and methods of the present disclosure relate generally to generating performance metrics that relate to the performance of an information resource such as a web page, website, app, or other online document. For example, content publisher computing devices (e.g., servers) can host or operate a web page of a content publisher. The web page can be accessed by other computing devices via the internet or other computer network. The content publisher may be interested in learning about the general audience traffic to their web page, such as an overall or aggregate number of visits to the web page (e.g., how many times the web page has been accessed, or how many computing devices have accessed the web page).

The content publisher may also be interested in visits to the web page by certain anonymous or generic audience segments. For example, the content publisher of a web page having content about shoes may be interested in determining whether or not the general audience accessing the web page includes a generic audience segment associated with shoes, rather than general web page visits unaffiliated with any interest in shoes. Using a content publisher computing device, a content publisher seeking this information can communicate with a data processing system via a computer network to request a report. The report can include a performance metric that indicates how well the web page (or other information resource) is performing or has performed in terms of attracting various generic audience segments.

For example, the data processing system can receive the request for a performance metric (e.g., as part of an analytics report regarding performance of a shoe-based web page) from the content publisher computing device. The data processing system can determine a number of visits to the information resource by a generic audience segment, such as a generic audience segment associated with shoes, and can also determine an aggregate (e.g., total) number of visits to the information resource. For example, the data processing system can determine the web page was visited 1000 times by a generic audience segment associated with shoes, and was visited 10,000 times overall. In this example, the number of visits to the web page by the audience segment is 1000, and the aggregate number of visits to the web page is 10,000. From this data, the data processing system can determine that one in ten, or 10% of visits to the shoe-based web page are from the shoe-related audience segment.

An indication that, for example, 10% of visits to the content provider's web page are by an anonymous shoe-related audience segment may not be sufficient to determine whether or not the web page is successful in attracting that audience segment. For example, a certain number of the general population of internet traffic is likely also associated with that market segment. This number may be greater than, equal to, or less than 10%. If the audience segment associated with shoes relative to the entire audience of internet (or other network) traffic is, for example, 20%, then there may be a 20% chance than any visit to any information resource of that network is associated with a shoe-related audience segment. In this example, if the data processing system determines that 20% of internet traffic belongs to a shoe-related audience segment, and 10% of traffic to the shoe-based web page is associated with the shoe-related audience segment, then the shoe based web page is underperforming for that market segment, as in this example 20% of traffic to any information resource should, on average, be associated with the shoe-based audience segment. The data processing system can generate a performance metric indicating this underperformance (or other result) and can provide this performance metric (e.g., as part of an analytical report) to the content publisher via the computer network.

FIG. 1 illustrates an example system 100 for evaluating the performance of information resources via at least one computer network, such as the network 105. The network 105 can include computer networks such as the internet, local, wide, metro or other area networks, intranets, satellite networks, other computer networks such as voice or data mobile phone communication networks, and combinations thereof. The network 105 can include or constitute a display network, e.g., a subset of information resources available on the internet that are associated with a content placement system, or that are eligible to include third party content items as part of a content item placement campaign. The system 100 can also include at least one data processing system 110, e.g., at least one logic device such as a computing device or server having a processor to communicate via the network 105, for example with at least one content publisher computing device 115 or at least one end user computing device 120.

The data processing system 110 can include at least one server. For example, the data processing system 110 can include a plurality of servers located in at least one data center or server farm. In one implementation, the data processing system 110 includes an information resource analytics system that generates statistical or other data about information resource traffic or other activity via the network 105. The data processing system 110 can include at least one analytics report request module 125, at least one performance metric generation module 130, and at least one database 135. The analytics report request module 125 and the performance metric generation module 130 can each include at least one processing unit, server, virtual server, circuit, engine, agent, appliance, or other logic device such as programmable logic arrays configured to communicate with the database 135 and with other computing devices (e.g., the content publisher computing device 115) via the network 105.

The analytics report request module 125 and the performance metric generation module 130 can include or execute at least one computer program or at least one script. The analytics report request module 125 and the performance metric generation module 130 can be separate components, a single component, or part of the data processing system 110. The analytics report request module 125 and the performance metric generation module 130 can include combinations of software and hardware, such as one or more processors configured to execute one or more scripts to obtain requests for reports or performance metrics for information resources, determine a number of visits to information resources by audience segments, determine an aggregate number of visits to information resources, identify first metrics based on the number of visits to information resources by audience segments and the aggregate number of visits to information resources, obtain global audience segment global aggregate audience data, determine second metrics based on the global audience segment global aggregate audience data, and generate performance metrics for the information resource based on the second metrics, for example.

The content publisher computing devices 115 can include personal computer, servers, mobile computing devices, or other computing devices operated by a content publishing entity to provide primary content for display via the network 105. For example, the content publisher computing device 115 can include a web page (or other information resource) operator who provides primary content for display on the web page (or other information resource) via the network 105. The primary content can include content other than that provided by the content publisher computing device 115, and the information resource can include content slots configured for the display of third party content items (e.g., ads) from a third party. For example, the content publisher computing device 115 can operate the website of a company and can provide content about that company for display on web pages of the website. The web pages can include content slots configured for the display of third party content items such as ads.

The end user computing devices 120 can include computing devices configured to communicate via the network 105 to display data such as the content provided by the content publisher computing device 115 (e.g., primary web page content or other information resources) as well as third party content items such as ads configured for display in a content slot of a web page). The end user computing device 120 and the content publisher computing device 115 can include desktop computers, laptop computers, tablet computers, smartphones, personal digital assistants, mobile devices, end user computing devices, consumer computing devices, servers, clients, and other computing devices. The end user computing device 120 and the content publisher computing device 115 can include user interfaces such as microphones, speakers, touchscreens, keyboards, pointing devices, a computer mouse, touchpad, or other input or output interfaces.

The data processing system 110 can include the analytics report request module 125 or the performance metric generation module 130 as part of one or more servers of an online analytics report generation system to evaluate the performance of information resources associated with the content publisher computing device 115 via the network 105. The data processing system 110 can generate a report including analytical data about the operation, use, renderings, availability or access of the information resource, and can provide the report to the content publisher computing device 115 via the network 105 for display by the content publisher computing device.

The analytics report request module 125 or the performance metric generation module 130 can be part of, or can include scripts executed by, one or more servers in the data processing system 110 (e.g., an analytics report generation system) to identify over or under performance of an information resource of the content publisher computing device 115. The analytics report request module 125 can be part of the same or a different server as the performance metric generation module 130 in the data processing system 110. The analytics report request module 125 can identify requests for reports received via the network 105 from the content publisher computing device 115 and can obtain information from data included in the request, such as information about the information resource or requested types of analytical data. The performance metric generation module 130 can determine performance metrics that relate to the success, quality, or performance of the information resource.

The system 100 can evaluate the performance of information resources such as a web page or other online document. In some implementations, the data processing system 110 obtains or receives a request for a performance metric of an information resource. For example, a content publisher (e.g., user) of the content publisher computing device 115 can request a report for an information resource. The request can be provided from the content publisher computing device 115 to the data processing system 110 via the network 105. The request can include a request for a performance metric, such as a metric indicating a level of performance of the information resource in attracting visits, renderings, clicks, conversions, or views, from an audience segment, such as a segment of the audience active via the network 105 associated with an interest in shoes (or other topic or characteristic). The request for the performance metric can be received by the analytics report request module 125 or other component of the data processing system 110.

The data processing system 110 can determine a number of visits to the information resource from an audience segment. For example, from the request or other source the data processing system 110 can identify an audience segment whose analytical data can be included in a report related to the performance of the information resource, such as an audience segment having an interest in shoes. Audience segment data used to generate performance metrics for information resources does not personally or individually identify specific end users. Rather, the audience segment includes a generic audience segment having a shared characteristic, e.g., shoes. The data processing system 110 (or component thereof such as the performance metric generation module 130) can determine the number of visits to the information resource from an audience segment based on information received from the content publisher computing device 115 (e.g., with the request for an analytical report or for the performance metric) or from the database 135 (e.g., responsive to receiving the request for the analytical report or the performance metric), for example.

The number of visits by an audience segment to the information resource can vary, from a low number (e.g., tens or hundreds of visits) to a large number (e.g., millions of visits). The number of visits by the audience segment can be a total number of visits to the information resource by the audience segment where repeat visits by an end user computing device 120 are each counted as a visit. The number of visits be the audience segment can also be a total number of end user computing device 120 visits, where multiple visits (e.g., hits, renderings or clicks on content of the information resource) to the information resource by a single end user computing device 120 are counted as a single visit.

The data processing system 110 can determine the aggregate number of visits to the information resource. For example the performance metric generation module 130 or other data processing system 110 component can obtain a total a volume of visits to the information resource. The data processing system 110 can obtain this information from the content publisher computing device 115 (e.g., with the request for the performance metric or separately from the request) or from the database 135. The aggregate number of visits can indicate a total volume of traffic to the information resource including or separately counting multiple visits by end user computing devices 120, or a total number of separate, anonymous end user computing devices 120 that access the information resource, without providing any personal identification information.

The aggregate number of visits to the information resource (e.g., by an audience) can be greater than the number of visits to the information resource by an audience segment (e.g., a segment or portion of the audience). For example, the data processing system 110 can determine that there are 1,000,000 visits to a web page having content about shoes (e.g., the aggregate number of visits to the information resource) and that 300,000 of those visits are visits to the shoe-based web page by a shoe-based audience segment, without providing any data personally identifying individual end users associated with any visits to the information resource.

To, for example, generate a report for the content publisher associated with the content publisher computing device 115 including a performance metric related to the audience segment, the data processing system 110 can identify a first metric based on the number of visits to the information resource by the audience segment (e.g., 300,000) and the aggregate number of visits to the information resource (e.g., 1,000,000). For example, the performance metric generation module 130 or other component of the data processing system 110 can generate the first metric indicating a ratio of the number of visits to the information resource by the audience segment (e.g., 300,000) to the aggregate number of visits to the information resource (e.g., 1,000,000). For example, the first metric can be a ratio of 300,000 to 1,000,000, or 300,000 divided by 1,000,000 (e.g., 0.30 or 30%).

The first metric, determined by the data processing system 110 based on information provided by the content publisher computing device 115 or retrieved from the database 135, can indicate a percentage of traffic to an information resource of the content publisher computing device by an audience segment of interest to the content publisher, such as a percentage of traffic by a shoe-related audience segment to a web page or website having shoe-related content, such as the example first metric indicating that 30% of traffic to the information resource is from a shoe-based audience segment.

In some implementations, the content publisher associated with the content publisher computing device 115 may seek additional information (e.g., a performance metric) to determine whether or not the 30% first metric indicates that the information resource is performing well or poorly, relative to other information resources available via the network 105. To determine or generate such a performance metric, the data processing system 110 can obtain a global audience segment number as well as a global aggregate audience number. The global aggregate audience number can indicate a total or estimated total number of users or end user computing devices 120 that access or can access the network 105. The global audience segment number can indicate the number (e.g., fraction or percent) of the global aggregate audience number that are part of the audience segment. The global aggregate audience number can indicate or estimate how many users of the network 105 exist, and the global audience segment number can indicate or estimate how many of the global aggregate number belong to an audience segment, e.g., a shoe-related audience segment.

For example, a total number of users of the network 105 (or a total number of end user computing devices 120 that access the network 105 or visit information resources of the network 105) can be 10,000,000. Of this example global aggregate audience number, the global audience segment (e.g., associated with shoes) may be 2,500,000, for example. In this example, the global audience segment is a subset of the global aggregate audience number, and the global aggregate audience number can be greater than the global audience segment. The data processing system 110 or a component thereof such as the performance generation module 130 can obtain the global audience segment number or the global aggregate audience number information from the database 135 or from third parties.

The global aggregate audience number (e.g., 10,000,000) can include the aggregate number of visits to the information resource (e.g., the 1,000,000 visits to the shoe-related web page) as well other visits to other information resources associated with the network (e.g., 9,000,000 visits to other information resources associated with the network 105). The data processing system 110 can determine a second metric from the global aggregate audience number and the global audience segment number. For example, the performance metric generation module 130 can generate a second metric indicating a ratio of the global audience segment number (e.g., 2,500,000) to the global aggregate audience number (e.g., 10,000,000). For example, the second metric can be a ratio of U.S. Pat. No. 2,500,000 to Ser. No. 10/000,000, or 2,500,000 divided by 10,000,000 (e.g., 0.25 or 25%). In this example, 25% of the network traffic, or of visits to all or a number of information resources in the network 105, are made by the shoe-related audience segment and 30% of the traffic or visits to the shoe-related web page (e.g., the information resource of the content publisher computing device 115 associated with the request for the analytical report) are made by the shoe-related audience segment. In this example, the shoe-related web page attracts a 5% higher rate of the shoe-related audience segment than other information resources associated with the network 105, which may or may not have content associated with shoes. In this example, the data processing system 110 can determine that the shoe-related web page is outperforming average information resources that are available via the network 105 by 5%.

The data processing system 110 can generate a performance metric based on the first metric and the second metric, or based on the first ratio and the second ratio. For example, the performance metric generation module 130 can generate a performance metric based on the first metric and the second metric. In some implementations, the data processing system or component thereof such as the performance metric generation module 130 generates the performance metric based on the first ratio and the second ratio. For example, if the first ratio indicates that 0.30 or 30% of visits to the shoe related web page (that is the subject of the evaluation) are from the shoe-based audience segment, and that 0.25 or 25% of network traffic in general to a number of information resources is from the shoe-based audience segment, the data processing system 110 can generate a performance metric of 0.3/0.25 or 1.2.

This performance metric can indicate whether or not the information resource under evaluation (e.g., the shoe-based web page) is over-performing, under-performing, or equally-performing information resources on the network 105 for an audience segment. In this example, a performance metric having a value greater than 1 can indicate over-performance of the information resource that is under evaluation (e.g., the subject of an analytical report) for an audience segment. A performance metric having a value less than 1 can indicate under-performance of the information resource relative to network information resources in general for that audience segment, and a performance metric having a value of 1 can indicate equal performance of the information resource relative to network information resources in general for that audience segment, (e.g., that the shoe-related web page is neither under nor over performing other information resources for that audience segment, where the other information resources may include information resources unrelated to the subject matter of the audience segment (e.g., shoes)).

In some implementations, the data processing system 110 generates the performance metric by comparing the first ratio (e.g., that is specific to the information resource under evaluation) to the second ratio (e.g., that relates to all or a number of information resources available via the network 105). The performance metric can also be based on a time period. For example, the request for the performance metric can include a time period, such as the previous day, week, month, or year. The data processing system 110 can determine the performance metric (and the various metrics and data about information resource visits) during this time period.

The data processing system 110 can include the performance metric in an analytical or other report about the information resource, and can provide the report (or just the performance metric) to at least one content publisher computing device 115 via the network 105, where it can be displayed to a user. In this example, the content publisher computing device 115 can request a report regarding performance of an information resource, and can receive in return the report including the performance metric.

Figure 2:
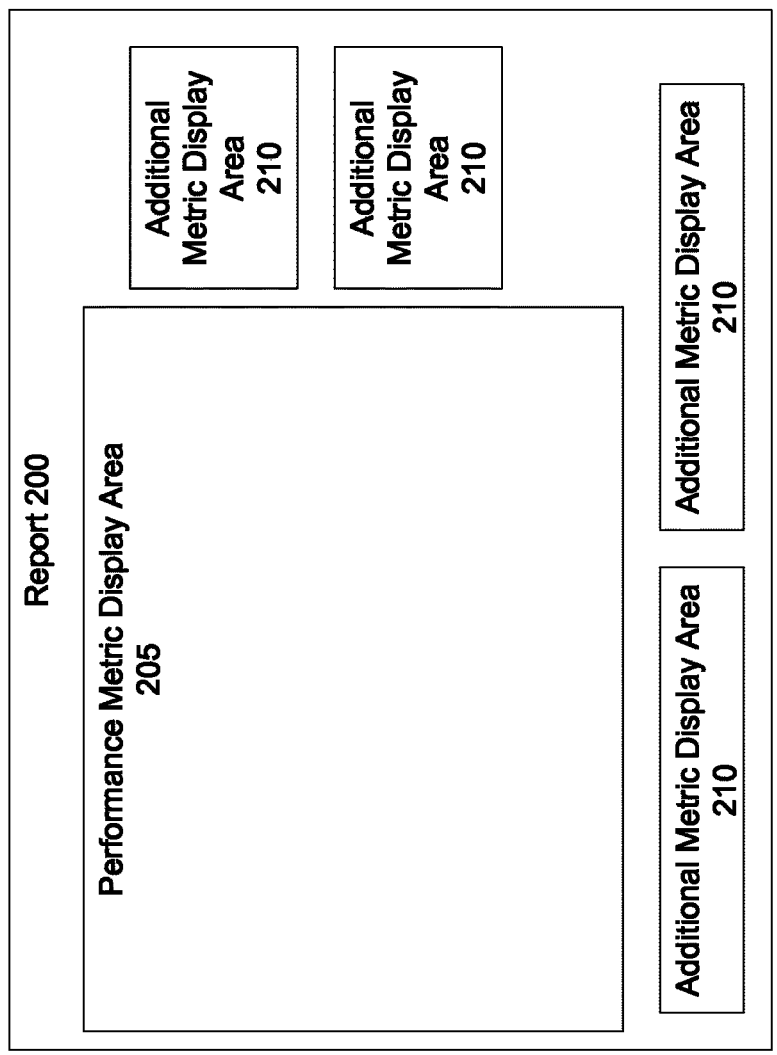
FIG. 2 is a display depicting one example of report including a performance metric of an information resource, according to an illustrative implementation.

FIG. 2 depicts an example analytical report 200 including at least one performance metric display area 205. The report 200 can be provided from the data processing system 110 to the content publisher computing device 115 via the network 105 for display by the content publisher computing device 115. The report 200 can be in various formats, e.g., editable, interactive, or read-only. The report 200 can be displayed within a web page or other information resource rendered by the content publisher computing device. The performance metric display area 205 can include at least the performance metric. The performance metric can be displayed in number, graphic, color coded, or visual form. The report 200 can include at least one additional metric display area 210, which can display additional information related to the information resource that is the subject of the report 200. For example, the additional metric display areas 210 can display the first metric or the second metric discussed herein, as well as additional graphical, text, or visual data identifying the information resource under consideration or regarding the performance of the information resource.

Figure 3:
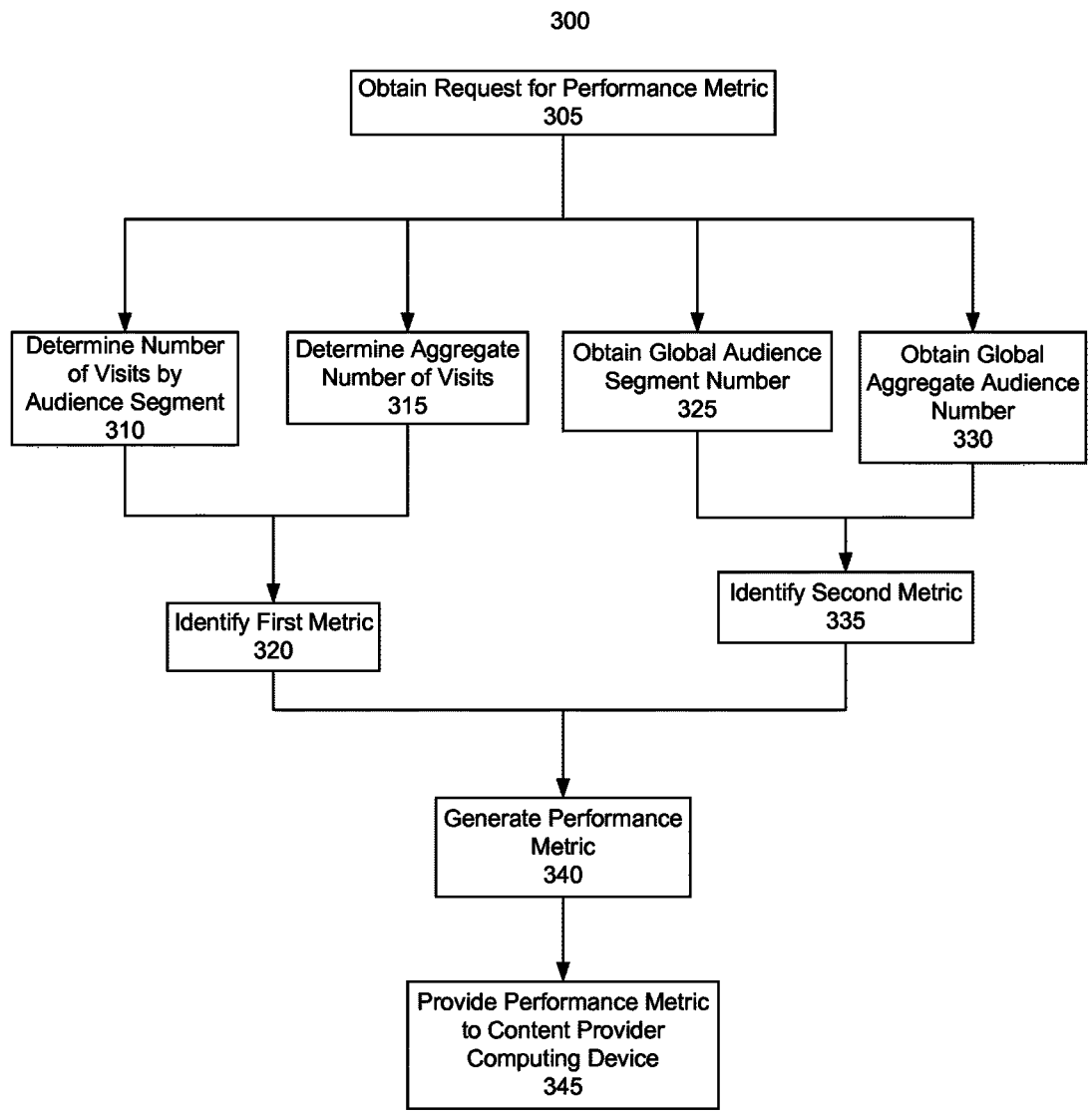
FIG. 3 is a flow diagram depicting an example method of evaluating performance of information resources, according to an illustrative implementation.

FIG. 3 depicts an example computer implemented method 300 of evaluating performance of an information resource in a computer networked environment. The method 300 can obtain at least one request for a performance metric (ACT 305). For example, the data processing system 110 can receive or obtain a request from the content publisher computing device 115 to generate a report for a web page (or other information resource) such as a shoe-related web page. The report can include the performance metric. The method 300 can determine the number of visits to the shoe-related web page (or other information resource under consideration) by at least one audience segment such as an audience segment interested in shoes (ACT 310). The method 300 can determine an aggregate number of visits to the information resource that is the subject of the report (ACT 315) and can identify a first metric (ACT 320) based on the determined number of visits by the audience segment (ACT 310) and by the aggregate number of visits to the information resource (ACT 315).

The method 300 can also obtain the global audience segment number, e.g., from the database 135, (ACT 325) and can obtain the global aggregate audience number, e.g., from the database 135 (ACT 330). The method 300 can identify a second metric (ACT 335) based on the determined number of visits by the global audience segment (ACT 325) and by the global aggregate audience number (ACT 330).

The method 300 can generate the performance metric (ACT 340), based for example, on the identified first metric (ACT 320) and the identified second metric (ACT 335). The method 300 can provide the performance metric to at least one content provider computing device 115 (ACT 345), e.g., via the network 105.

Figure 4:
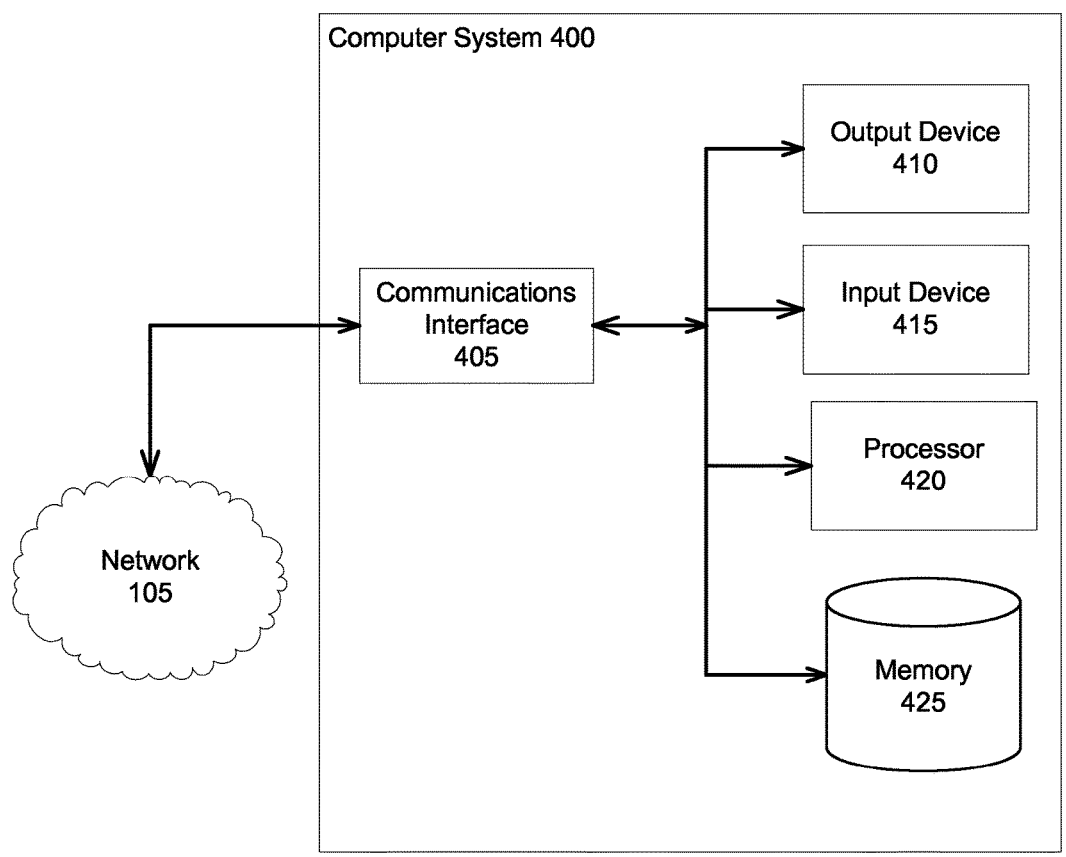
FIG. 4 is a block diagram illustrating a general architecture for a computer system that may be employed to implement elements of the systems and methods described and illustrated herein, according to an illustrative implementation.

FIG. 4 shows the general architecture of an illustrative computer system 400 that may be employed to implement any of the computer systems discussed herein (including the system 100 and its components such as the data processing system 110, the analytics report request module 125 or the performance metric generation module 130) in accordance with some implementations. The computer system 400 can be used to provide information via the network 105, for example to request or generate performance metrics for information resources associated with the content publisher computing device 115. The computer system 400 includes one or more processors 420 communicatively coupled to at least one memory 425, one or more communications interfaces 405, and one or more output devices 410 (e.g., one or more display units) and one or more input devices 415. The processors 420 can be included in the data processing system 110 or the other components of the system 100 such as the analytics report request module 125 or the performance metric generation module 130.

The memory 425 can include computer-readable storage media, and can store computer instructions such as processor-executable instructions for implementing the operations described herein. The analytics report request module 125 or the performance metric generation module 130, or the database 135 can include the memory 425 to store the aggregate number of visits to information resources, the number of audience segment visits to information resources, the size or number of the global audience segment, the global aggregate audience number, the first metric associated with the aggregate number of visits to information resources and the number of audience segment visits to information resources, the second metric associated with the global audience segment and the global aggregate audience number, or the performance metric, for example. The at least one processor 420 can execute instructions stored in the memory 425 and can read from or write to the memory information processed and or generated pursuant to execution of the instructions.

The processors 420 can be communicatively coupled to or control the at least one communications interface 405 to transmit or receive information pursuant to execution of instructions. For example, the communications interface 405 can be coupled to a wired or wireless network, bus, or other communication means and can allow the computer system 400 to transmit information to or receive information from other devices (e.g., other computer systems). One or more communications interfaces 405 can facilitate information flow between the components of the system 100. In some implementations, the communications interface 405 can (e.g., via hardware components or software components) to provide a website as an access portal to at least some aspects of the computer system 400. Examples of communications interfaces 405 include user interfaces.

The at least one output devices 410 can allow information to be viewed or perceived in connection with execution of the instructions. The at least one input device 615 can allow a user to make manual adjustments, make selections, enter data or other information, or interact in any of a variety of manners with the processor during execution of the instructions.

The subject matter and the operations described herein can be implemented in digital electronic circuitry, or in computer software, firmware, or hardware, including the structures disclosed in this specification and their structural equivalents, or in combinations of one or more of them. The subject matter described in this specification can be implemented as one or more computer programs, e.g., one or more modules of computer program instructions, encoded on computer storage medium for execution by, or to control the operation of, data processing apparatus. The program instructions can be encoded on an artificially-generated propagated signal, e.g., a machine-generated electrical, optical, or electromagnetic signal that is generated to encode information for transmission to suitable receiver apparatus for execution by a data processing system or apparatus. A computer storage medium can be, or be included in, a computer-readable storage device, a computer-readable storage substrate, a random or serial access memory array or device, or a combination of one or more of them. While a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices). The operations described in this specification can be implemented as operations performed by a data processing apparatus on data stored on one or more computer-readable storage devices or received from other sources.

For situations in which the systems discussed herein collect personal information about users, or may make use of personal information, the users may be provided with an opportunity to control whether programs or features that may collect personal information (e.g., information about a user's social network, social actions or activities, a user's preferences, or a user's location), or to control whether or how to receive content from a content server or other data processing system that may be more relevant to the user. In addition, certain data may be anonymized in one or more ways before it is stored or used, so that personally identifiable information is removed when generating parameters. For example, a user's identity may be anonymized so that no personally identifiable information can be determined for the user, or a user's geographic location may be generalized where location information is obtained (such as to a city, postal code, or state level), so that a particular location of a user cannot be determined. Thus, the user may have control over how information is collected about him or her and used by the content server.

The term "data processing system" or "computing device" "module" "engine" or "component" encompasses apparatuses, devices, and machines for processing data, including by way of example a programmable processor, a computer, a system on a chip, or multiple ones, or combinations, of the foregoing. The apparatuses can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination thereof. The apparatus and execution environment can realize various different computing model infrastructures, such as web services, distributed computing and grid computing infrastructures.

The analytics report request module 125 or the performance metric generation module 130 can include or share one or more data processing apparatuses, systems, computing devices, or processors.

A computer program (also known as a program, software, software application, app, script, or code) can be written in any form of programming language, including compiled or interpreted languages, declarative or procedural languages, and can be deployed in any form, including as a stand-alone program or as a module, component, subroutine, object, or other unit suitable for use in a computing environment. A computer program may, but need not, correspond to a file in a file system. A computer program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs (e.g., components of the data processing system 110) to perform actions by operating on input data and generating output. The processes and logic flows can also be performed by, and apparatuses can also be implemented as, special purpose logic circuitry, e.g., an FPGA (field programmable gate array) or an ASIC (application-specific integrated circuit).

The subject matter described herein can be implemented in a computing system that includes a back-end component, e.g., as a data server, or that includes a middleware component, e.g., an application server, or that includes a front-end component, e.g., a client computer having a graphical user interface or a web browser through which a user can interact with an implementation of the subject matter described in this specification, or a combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system such as system 100 or system 400 can include clients and servers. A client and server are generally remote from each other and typically interact through a communication network (e.g., the network 105). The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server (e.g., received by the data processing system 110 from the content publisher computing device 115).

While operations are depicted in the drawings in a particular order, such operations are not required to be performed in the particular order shown or in sequential order, and all illustrated operations are not required to be performed. Actions described herein can be performed in a different order.

The separation of various system components does not require separation in all implementations, and the described program components can be included in a single hardware or software product. For example, the analytics report request module 125 or the performance metric generation module 130 can be a single module, a logic device having one or more processing circuits, or part of one or more servers of the data processing system 110.

Having now described some illustrative implementations, it is apparent that the foregoing is illustrative and not limiting, having been presented by way of example. In particular, although many of the examples presented herein involve specific combinations of method acts or system elements, those acts and those elements may be combined in other ways to accomplish the same objectives. Acts, elements and features discussed in connection with one implementation are not intended to be excluded from a similar role in other implementations or implementations.

The phraseology and terminology used herein is for the purpose of description and should not be regarded as limiting. The use of "including" "comprising" "having" "containing" "involving" "characterized by" "characterized in that" and variations thereof herein, is meant to encompass the items listed thereafter, equivalents thereof, and additional items, as well as alternate implementations consisting of the items listed thereafter exclusively. In one implementation, the systems and methods described herein consist of one, each combination of more than one, or all of the described elements, acts, or components.

Any references to implementations or elements or acts of the systems and methods herein referred to in the singular may also embrace implementations including a plurality of these elements, and any references in plural to any implementation or element or act herein may also embrace implementations including only a single element. References in the singular or plural form are not intended to limit the presently disclosed systems or methods, their components, acts, or elements to single or plural configurations. References to any act or element being based on any information, act or element may include implementations where the act or element is based at least in part on any information, act, or element.

Any implementation disclosed herein may be combined with any other implementation or embodiment, and references to "an implementation," "some implementations," "an alternate implementation," "various implementations," "one implementation" or the like are not necessarily mutually exclusive and are intended to indicate that a particular feature, structure, or characteristic described in connection with the implementation may be included in at least one implementation or embodiment. Such terms as used herein are not necessarily all referring to the same implementation. Any implementation may be combined with any other implementation, inclusively or exclusively, in any manner consistent with the aspects and implementations disclosed herein.

References to "or" may be construed as inclusive so that any terms described using "or" may indicate any of a single, more than one, and all of the described terms.

Where technical features in the drawings, detailed description or any claim are followed by reference signs, the reference signs have been included to increase the intelligibility of the drawings, detailed description, and claims. Accordingly, neither the reference signs nor their absence have any limiting effect on the scope of any claim elements.

The systems and methods described herein may be embodied in other specific forms without departing from the characteristics thereof. The foregoing implementations are illustrative rather than limiting of the described systems and methods. For example, numbers discussed herein regarding visits to information resources (e.g., 10,000,000; 2,500,000; 1,000,000; 300,000) are examples, and information resources can have any number of visits. Scope of the systems and methods described herein is thus indicated by the appended claims, rather than the foregoing description, and changes that come within the meaning and range of equivalency of the claims are embraced therein.

What is claimed is:

1. A computer implemented method of evaluating performance of an information resource in a computer networked environment, comprising:

obtaining, by a data processing system, from a content publisher computing device via a computer network, a request for a performance metric of the information resource;

determining, by the data processing system, a number of visits to the information resource by an audience segment;

determining an aggregate number of visits to the information resource, the aggregate number greater than the number of visits to the information resource by the audience segment;

identifying a first metric, the first metric indicating a first ratio of the number of visits to the information resource by the audience segment to the aggregate number of visits to the information resource;

obtaining, by the data processing system, a global audience segment number corresponding to a total number of users or devices associated with the audience segment across a communications network including the information resource and other information resources;

obtaining, by the data processing system, a global aggregate audience number representing a total number of users or devices across the communications network, the global aggregate audience number greater than the global audience segment number;

identifying a second metric, the second metric indicating a second ratio of the global audience segment number to the global aggregate audience number;

generating the performance metric based on the first ratio and the second ratio; and transmitting information based on the generated performance metric to a computer configured to modify the information resource.

2. The method of claim 1, comprising:
identifying, from the request for the performance metric, a time period;
determining the number of visits to the information resource during the time period;
determining the aggregate number of visits to the information resource during the time period;
determining the global audience segment number during the time period;
determining the global aggregate audience number during the time period; and
generating the performance metric for the time period.

3. The method of claim 1, comprising:
identifying, from the request for the performance metric, a shared characteristic of the audience segment; and
generating the performance metric for the shared characteristic.

4. The method of claim 1, comprising:
determining that the performance metric indicates one of an over-performance of the information resource relative to the audience segment, an under-performance of the information resource relative to the audience segment, and an equal performance of the information resource relative to the audience segment.

5. The method of claim 1, wherein the computer is the content publisher computing device.

6. The method of claim 1, comprising:
comparing the first ratio to the second ratio to generate the performance metric.

7. The method of claim 1, comprising:
dividing the first metric by the second metric to generate a quotient, the quotient indicating the performance metric.

8. The method of claim 7, wherein the quotient having a value greater than 1 indicates over-performance of the information resource for the audience segment, the quotient having a value less than 1 indicates under-performance of the information resource for the audience segment; and the quotient having a value of 1 indicates equal performance on the information resource for the audience segment.

9. The method of claim 1, comprising:
dividing the number of visits to the information resource by the audience segment to the aggregate number of visits to the information resource to generate the first metric;
dividing the global audience segment number by the global aggregate audience number to generate the second metric; and
dividing the first metric by the second metric to generate the performance metric.

10. The method of claim 1, comprising:
determining, by at least one processor of the data processing system, the number of visits to the information resource by the audience segment;
determining by at least one processor of the data processing system, the aggregate number of visits to the information resource;
obtaining, by the data processing system from at least one database, the global audience segment number;
obtaining, by the data processing system from at least one database, the global aggregate audience number.

11. A system of evaluating performance of an information resource in a computer networked environment, comprising:
a data processing system configured to obtain, from a content publisher computing device via a computer network, a request for a performance metric of the information resource;
the data processing system configured to:
determine a number of visits to the information resource by an audience segment;
determine an aggregate number of visits to the information resource, the aggregate number greater than the number of visits to the information resource by the audience segment;
identify a first metric, the first metric indicating a first ratio of the number of visits to the information resource by the audience segment to the aggregate number of visits to the information resource;
obtain, by the data processing system, a global audience segment number corresponding to a total number of users or devices associated with the audience segment across a communications network including the information resource and other information resources;
obtain a global aggregate audience number representing a total number of users or devices across the communications network, the global aggregate audience number greater than the global audience segment number;
identify a second metric, the second metric indicating a second ratio of the global audience segment number to the global aggregate audience number;
generate the performance metric based on the first ratio and the second ratio; and
transmit information based on the generated performance metric to the content publisher computing device, wherein the content publisher computing device is configured to modify the information resource.

12. The system of claim 11, comprising:
the data processing system operating to divide the first metric by the second metric to generate a quotient, the quotient indicating the performance metric.

13. The system of claim 11, comprising:
the data processing system operating to:
identify, from the request for the performance metric, a time period;
determine the number of visits to the information resource during the time period;
determine the aggregate number of visits to the information resource during the time period;
determine the global audience segment number during the time period;
determine the global aggregate audience number during the time period; and
generate the performance metric for the time period.

14. The system of claim 11, comprising:
the data processing system configured to identify, from the request for the performance metric, a shared characteristic of the audience segment; and to
generate the performance metric for the shared characteristic.

15. The system of claim 11, comprising:
at least one processor of the data processing system operating to:
calculate the number of visits to the information resource by the audience segment; and
determine by at least one processor of the data processing system, the aggregate number of visits to the information resource; and
the data processing system operating to obtain, from at least one database, the global audience segment number, and the global aggregate audience number.

16. A computer readable storage medium storing instructions that when executed by one or more data processors, cause the one or more data processors to perform operations comprising:
obtaining from a content publisher computing device via a computer network, a request for a performance metric of the information resource;
determining a number of visits to the information resource by an audience segment;
determining an aggregate number of visits to the information resource, the aggregate number greater than the number of visits to the information resource by the audience segment;
identifying a first metric, the first metric indicating a first ratio of the number of visits to the information resource by the audience segment to the aggregate number of visits to the information resource;
obtaining a global audience segment number corresponding to a total number of users or devices associated with the audience segment across a communications network including the information resource and other information resources;

obtaining a global aggregate audience number representing a total number of users or devices across the communications network, the global aggregate audience number greater than the global audience segment number;

identifying a second metric, the second metric indicating a second ratio of the global audience segment number to the global aggregate audience number;

generating the performance metric based on the first ratio and the second ratio; and transmitting information based on the generated performance metric to a computer configured to modify the information resource.

17. The computer readable storage medium of claim 16 storing instructions that when executed by one or more data processors, cause the one or more data processors to perform operations comprising:

determining the number of visits to the information resource by the audience segment;

determining the aggregate number of visits to the information resource;

obtaining, from at least one database, the global audience segment number; and obtaining the global aggregate audience number.

18. The computer readable storage medium of claim 16 storing instructions that when executed by one or more data processors, cause the one or more data processors to perform operations comprising:

identifying, from the request for the performance metric, a time period;

determining the number of visits to the information resource during the time period;

determining the aggregate number of visits to the information resource during the time period;

determining the global audience segment number during the time period;

determining the global aggregate audience number during the time period; and generating the performance metric for the time period.

19. The computer readable storage medium of claim 16 storing instructions that when executed by one or more data processors, cause the one or more data processors to perform operations comprising:

identifying, from the request for the performance metric, a shared characteristic of the audience segment; and generating the performance metric for the shared characteristic.

20. The computer readable storage medium of claim 16 wherein the computer is the content publishing computing device.

* * * * *